April 21, 1970 F. E. MOELLER 3,507,998
RESYNCHRONIZING CIRCUIT
Filed Dec. 7, 1967
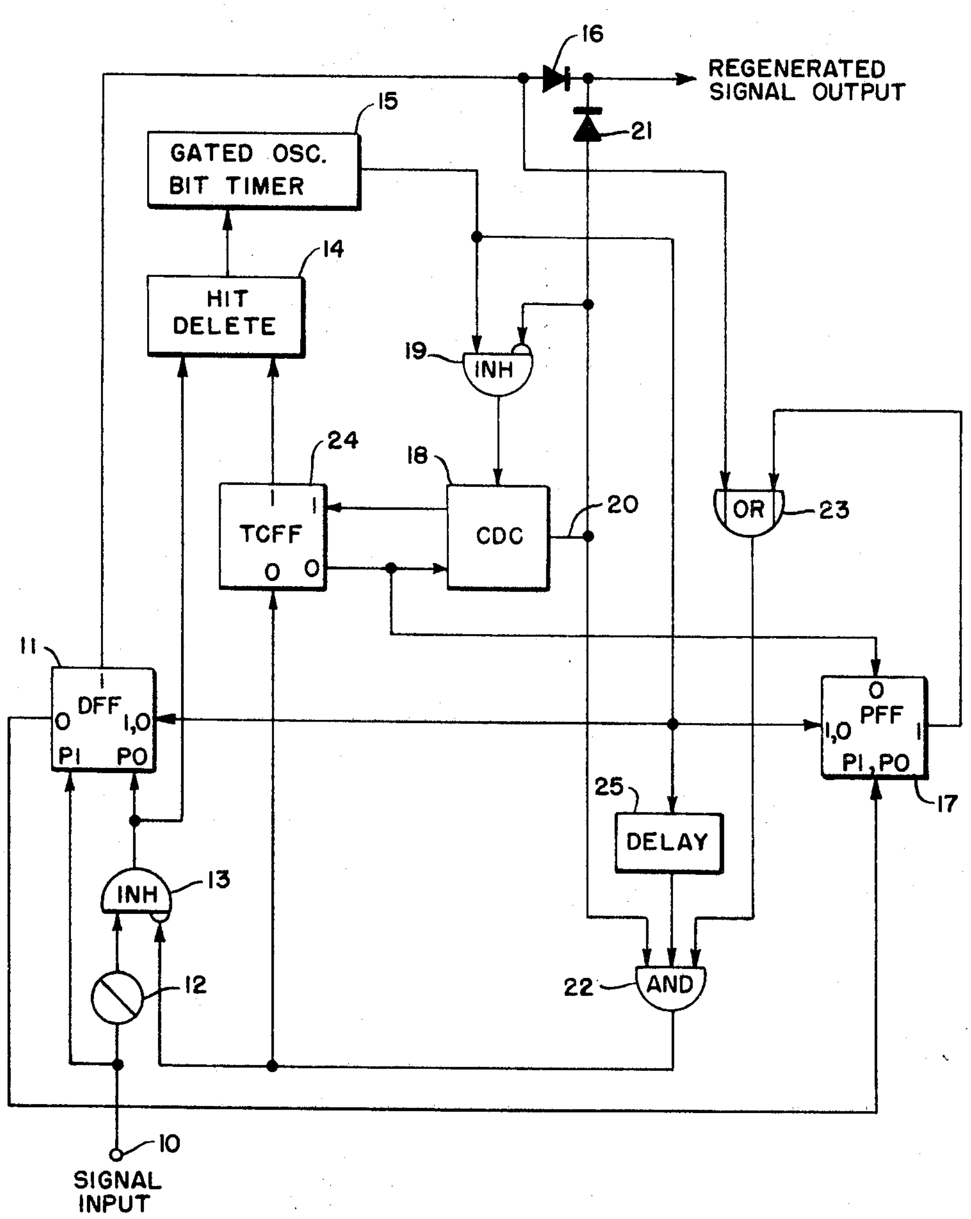
INVENTOR
FRANK E. MOELLER
BY LaValle Rash
ATTORNEY United States Patent Office 3,507,998
Patented Apr. 21, 1970

3,507,998

RESYNCHRONIZING CIRCUIT

Frank E. Moeller, Elk Grove, Ill., assignor to Teletype Corporation, Skokie, Ill., a corporation of Delaware Filed Dec. 7, 1967, Ser. No. 688,853
Int. Cl. H04l 25/20
U.S. Cl. 178—70 6 Claims

ABSTRACT OF THE DISCLOSURE

A resynchronizing signal regenerator for a start-stop permutation-encoded signal train samples for the presence of a stop signal and correct parity at the end of each received character. If the stop signal is present or if correct parity is found, correct character synchronization is assumed. If the sampled signal is not of the same type as the stop signal and if incorrect parity exists, lack of synchronization is indicated; a stop signal is inserted into the output of the regenerator; and recycling is delayed until an input signal having the same characteristics as a stop signal is detected or correct parity is obtained.

BACKGROUND OF THE INVENTION

In the transmission of start-stop telegraph signal trains, distortion of the ideal square wave signals often occurs to such an extent that it is necessary to regenerate the signal in order that it may be utilized by the receiving equipment. Regeneration of the signal generally is accomplished by sampling each bit of the incoming signal train substantially at the midpoint and using the sample to set a bistable multivibrator or a flip-flop to the sampled condition until the next sample interval occurs. The output of the flip-flop then is the desired regenerated signal. In addition, it is important that the regenerator be placed in character synchronization with the incoming start-stop signal train. Normally, character synchronization is considered present if the signal condition used for a stop signal is present at the end of a character timing interval. If it is absent, lack of character synchronization is assumed and resynchronization steps are initiated. A system operated in this manner, however, is thrown out of synchronization whenever the stop signal is so badly distorted at the time it is sampled that the wrong signal condition is present at the time of the sample.

SUMMARY OF THE INVENTION

In accordance with a preferred embodiment of this invention, character synchronization of a regenerative repeater used in start-stop telegraph transmission is accomplished by sampling the signal input train with a data flip-flop set by the output of a gated oscillator bit timer at the midpoint of each incoming bit of the input signal train. Each character of the input signal is provided with a parity check bit and the regenerated signal obtained from the data flip-flop is supplied to a parity flip-flop operated as a modulo 2 counter for providing a parity check in the regenerator. A valid start signal (spacing condition) received by the system triggers the gated oscillator into operation, and the oscillator in turn supplies pulses to a character decade counter which counts a sufficient number of pulses to be equal to the number of code elements or bits in an incoming character. When this number of pulses have been counted by the decade counter, it causes a stop bit to be inserted into the output line from the regenerator and also initiates the sampling of the regenerated signal and the output of the parity flip-flop. At this time, if either the regenerated signal is a marking or stop signal, or if the output of the parity flip-flop indicates that the desired parity condition exists, the system is reset and awaits reception of the next start or space signal on the input signal line. If the sampled output of the data flip-flop of the regenerator is a space and the output of the parity flip-flop indicates incorrect parity, the character decade counter remains set to its final count; and the gated oscillator continues to run, causing the input signal train continuously to be sampled. At the same time, the output of the regenerator is held marking, thereby prolonging the duration of the stop signal supplied from the regenerator. As soon as the sampled input signal changes to a marking or stop condition or the parity flip-flop indicates correct parity, the circuit is reset and the cycle of operation is repeated.

BRIEF DESCRIPTION OF THE DRAWING

The single figure of the drawing is a circuit diagram of a preferred embodiment of the invention.

DETAILED DESCRIPTION

For the purpose of illustration, a marking signal will be referred to as being a positive potential and a space signal as being a negative potential. Similarly, throughout the description of the preferred embodiment of the invention the terms "positive" and "negative" will be used to differentiate the two conditions of the signals applied to the inputs and obtained from the outputs of the various components of the circuit. These terms do not necessarily imply that positive and negative potentials actually must be employed in the circuit, and are used merely to facilitate the description of the operation of the circuit. A start signal arbitrarily is designated as a spacing or negative signal; and a stop signal is designated as a marking or positive signal.

Assume that the circuit is in its idle condition awaiting the receipt of the first signal in an input signal train to be regenerated. This first signal should be a negative start signal and is applied directly from an input terminal 10 to the "P1" input of a data flip-flop 11 and through an inverter 12 and an inhibit gate 13 to the "P0" input of the flip-flop 11. In the idle condition, the signal applied to the inhibit input of the inhibit gate 13 is negative; so that the negative start signal, inverted to a positive signal by the inverter 12, is passed by the inhibit gate 13 causing a positive priming potential to be applied to the "P0" input of the flip-flop 11. It should be noted, at this time, that the flip-flop 11 and the other flip-flops used in this circuit are of the type disclosed in Patent No. 3,322,896 issued to F. D. Biggam on May 30, 1967. These flip-flops have priming inputs and trigger inputs and require a positive potential on the priming input associated with a trigger input before the flip-flop can be set by a positive pulse appearing on the trigger input.

The output of the inhibit gate 13 also is supplied to the input of a hit-delete circuit 14 of the type commonly used in regenerative repeaters. If the output of the inhibit gate 13 remains positive for a period of time equal to or greater than one-half of a bit interval, a positive output is obtained from the hit/delete circuit 14 and is supplied to the input of a gated oscillator 15, which may be of the type disclosed in Patent No. 3,210,687 issued to C. J. Rocca on Oct. 5, 1965, thereby enabling the gated oscillator; so that it commences to produce clock pulses at the bit or code element rate of the incoming signal train.

The first output pulse from the oscillator 15 is obtained immediately when the oscillator is gated into operation and is applied to the "1" and "0" trigger inputs of the data flip-flop 11, setting the flip-flop 11 to its "0" state causing the "0" output thereof to be at a positive potential and the "1" output to become negative. The "1" output of the data flip-flop 11 is supplied through a diode 16 as the regenerated signal output of the circuit. The "0" output of the flip-flop 11 is supplied to the "P1" and "P0" priming inputs of a parity flip-flop 17 causing a positive priming potential to be applied to both priming inputs of the flip-flop 17 whenever the flip-flop 11 is set to its "0" state. Every pulse obtained from the output of the oscillator 15 also is supplied to both trigger inputs of the parity flip-flop 17, so that it changes state each time the data flip-flop 11 is set to its "0" or spacing state. Thus, the parity flip-flop 17 is operated as a complementary flip-flop or a modulo 2 counter to provide an odd-even parity count of the number of spacing bits in each received character.

In the idle state, a character decade counter is set to an initial or 0 count, and each pulse obtained from the gated oscillator 15 is passed through an inhibit gate 19 to the counter 18 causing it to advance at the bit rate of the incoming signal. The first step or count of the counter 18 causes a trigger pulse to be applied to the permanently primed set "1" trigger input of a timing control flip-flop 24, setting the flip-flop 24 to its "1" state. The "1" output of the flip-flop 24 is applied to the hit/delete circuit 14 causing its output to remain positive for the duration of a character interval. The system continues to operate with the output of the data flip-flop 11 being supplied as the regenerated signal and with the parity flip-flop 17 providing an odd/even count of the spacing bits in the regenerated signal until the character decade counter 18 reaches a count indicative of the end of a character interval. It should be noted that this end-of-character or final count of the decade counter 18 must include a count of all of the information bits of the character plus a count of the start and stop signals associated with each character. When this final count is reached, a positive potential is obtained on a lead 20 at the output of the character recade counter 18, causing an inhibit signal to be supplied to the inhibit input of the inhibit gate 19, thereby preventing any further pulses obtained from the output of the oscillator 15 from changing the count in the decade counter 18.

The positive potential appearing on the lead 20 also is supplied through a diode 21 to the output signal line forcing the appearance of a positive or marking potential on the signal line, irrespective of the signals obtained from the "1" output of the data flip-flop 10. In addition, the positive potential appearing on the lead 20 is supplied to one of three inputs of a sampling AND-gate 22 thereby enabling the gate. One of the other inputs to the AND-gate 22 is obtained from the output of an OR-gate 23, the inputs to which are the "1" outputs of the data flip-flop 11 and the parity flip-flop 17.

If the parity flip-flop 17 indicates that correct parity for the character exists (in the embodiment shown, a positive potential is obtained from the "1" output of the flip-flop 17 when an odd number of space signals occurs in the character) or if the data flip-flop "1" output is positive indicating a marking or stop signal, the output of the OR-gate is positive.

The positive output pulse obtained from the gated oscillator 15 is slightly delayed by a delay circuit 25; is passed by the AND-gate 22 prior to the occurrence of the next clock pulse from the oscillator 15; and is applied to the permanently primed "0" trigger input of the timing control flip-flop 24, resetting the flip-flop 24 to its "0" state. A positive potential then is obtained from the "0" output of the flip-flop 24 and resets the counter 18 to its initial of 0 count and resets the parity flip-flop 17 to its "0" state. During the time that the output is present from the AND-gate 22, it is applied to the inhibit input of the inhibit gate 13 thereby insuring that the system is reset in the event that a signal transition appears at the signal input terminal 10 at this time.

As soon as the counter 18 is reset, the potential on the output lead 20 drops to a negative potential thereby disabling the AND-gate 22 and removing the inhibit input from the inhibit gate 19; so that the counter 18 once against is rendered responsive to the output pulses from the oscillator 15. As the same time, the positive potential applied through the diode 21 to the output line, causing the insertion of a stop signal on the line, is removed; so that once again the output line is placed under control of the "1" output of the data flip-flop 11.

Thus, it can be seen that character synchronization of the regenerative repeater is placed under control of both the stop signal and the output of the parity flip-flop; so that if the stop signal is so badly distorted that it appears as a spacing signal at the time the sample is made, character synchronization still is maintained if the output of the parity flip-flop indicates correct parity. Only in the event that the correct stop signal condition is not present and the parity flip-flop indicates incorrect parity is the system assumed to be out of character synchronization causing a locally generated stop signal to be inserted onto the output line until a marking or stop signal condition is received. In this manner character synchronization is rapidly achieved and is accurately maintained throughout the operation of the system.

I claim:

1. A synchronizing circuit for controlling the character synchronization of a receiving instrumentality responsive to start-stop signals wherein each character includes a predetermined count of code elements of one of two possible conditions and wherein the start and stop signals are of opposite ones of the two conditions including:

means operated in response to a signal of the condition used for a start signal for timing a character interval;

means for obtaining a count of the code elements of said one condition occurring in a character interval;

means responsive to a combination of the output of the character interval timing means and the output of the counting means at the end of a character interval, and also responsive to a combination of the output of the timing means and a received signal of the condition used for a stop signal for providing an output signal, said output signal resetting the character interval timing means and the counting means to predetermined conditions.

2. A circuit according to claim 1 wherein the sampling means continues to sample the received signal and the output of the counting means until one of the conditions necessary for producing an output signal therefrom is sensed.

3. In a start-stop receiving instrumentality for receiving permutation-coded characters each including a predetermined modulo 2 count of elements of one of two conditions, a start signal of a first of the two conditions, and a stop signal of the second of the two conditions, means responsive to receipt of a start signal for counting the number of code elements subsequently received;

a parity counter for providing a modulo 2 count of the code elements of said one of the two conditions;

means responsive to a predetermined count by the code element counter for sampling the received signal and the output of the parity counter and providing an output signal only if the received signal is of the second condition or if the output of the parity counter is of a predetermined one of two possible conditions.

4. An instrumentality according to claim 3 including means responsive to the output of the sampling means for resetting the counters to predetermined initial conditions.

5. An instrumentality according to claim 4 wherein the code element counter remains set to the predetermind count of code elements until it is reset by the resetting means irrespective of the number of code elements received after the predetermined count is reached.

6. An instrumentality according to claim 4 wherein the sampling means samples the received signal and the output of the parity counter so long as the code element counter remains set to the predetermined count.

References Cited

UNITED STATES PATENTS

| | | |
|---|---|---|
| 3,075,175 | 1/1963 | Lourie. |
| 3,159,811 | 12/1964 | James et al. |
| 3,383,465 | 5/1968 | Wilson. |
| 3,396,239 | 8/1968 | Yamauchi. |

JOHN W. CALDWELL, Primary Examiner

M. M. CURTIS, Assistant Examiner

U.S. Cl. X.R.

178—23, 69, 69.5; 340—146.1